US010008814B1

(12) United States Patent
Kim et al.

(10) Patent No.: US 10,008,814 B1
(45) Date of Patent: Jun. 26, 2018

(54) MICROPHONE MUTING DEVICE

(71) Applicant: Holster Lab LLC, Nampa, ID (US)

(72) Inventors: Edward J. Kim, Star, ID (US); Chadd Van Komen, Nampa, ID (US)

(73) Assignee: Holster Lab LLC, Nampa, ID (US)

(*) Notice: Subject to any disclaimer, the term of this patent is extended or adjusted under 35 U.S.C. 154(b) by 0 days. days.

(21) Appl. No.: 15/896,195

(22) Filed: Feb. 14, 2018

Related U.S. Application Data

(60) Provisional application No. 62/459,172, filed on Feb. 15, 2017.

(51) Int. Cl.

| | |
|---|---|
| ***H02B 1/00*** | (2006.01) |
| ***H01R 13/66*** | (2006.01) |
| ***H01R 24/58*** | (2011.01) |
| ***H04R 3/00*** | (2006.01) |
| *H01R 107/00* | (2006.01) |

(52) U.S. Cl.
CPC ........... *H01R 13/665* (2013.01); *H01R 24/58* (2013.01); *H04R 3/00* (2013.01); *H01R 2107/00* (2013.01)

(58) Field of Classification Search
CPC ........................................................ H02B 1/00
See application file for complete search history.

(56) References Cited

U.S. PATENT DOCUMENTS

| | | | | |
|---|---|---|---|---|
| 6,292,560 B1 | 9/2001 | Gligoric | | |
| 6,751,316 B1 | 6/2004 | Gligoric | | |
| 7,110,799 B1 | 9/2006 | Willins et al. | | |
| 9,319,768 B2 * | 4/2016 | Larsen | H04R 1/1041 | |
| 2008/0095386 A1 * | 4/2008 | Rollins | H04R 1/04 | 381/113 |
| 2008/0159561 A1 * | 7/2008 | Parker | G06F 9/4418 | 381/94.5 |
| 2009/0011628 A1 * | 1/2009 | Purchon | H01R 13/7031 | 439/188 |
| 2013/0219525 A1 * | 8/2013 | Soffer | G06F 3/162 | 726/34 |
| 2013/0320993 A1 * | 12/2013 | Mehrabi | G01R 31/04 | 324/508 |
| 2014/0143864 A1 * | 5/2014 | Miliefsky | H04L 63/20 | 726/22 |

(Continued)

*Primary Examiner* — Olisa Anwah
(74) *Attorney, Agent, or Firm* — Swanson & Bratschun, L.L.C.

(57) ABSTRACT

Novel tools and techniques are provided for muting a microphone of an electronic device. In various embodiments, a muting device might include a headphone jack and a muting circuit. The headphone jack might include first, second, third, and fourth contacts, the first contact including a left line output contact, the second contact including a right line output contact, the third contact including a ground contact, and a fourth contact including a microphone contact. The muting circuit simulates an external microphone being connected to the headphone jack, without the microphone contact being connected to any microphone. In particular, when the headphone jack of the muting device is connected to the headphone port of a user device, the muting circuit might send a signal to the user device indicating that an external microphone is communicatively coupled to the headphone jack, thereby causing the built-in microphone of the user device to be deactivated.

12 Claims, 4 Drawing Sheets

(56) References Cited

U.S. PATENT DOCUMENTS

| | | | | |
|---|---|---|---|---|
| 2014/0198439 | A1* | 7/2014 | De Pietro | G06F 1/16 361/679.02 |
| 2015/0059251 | A1* | 3/2015 | Rinner | G06F 1/1656 49/465 |
| 2015/0364124 | A1* | 12/2015 | Tyson | G10K 11/16 181/290 |
| 2016/0234356 | A1* | 8/2016 | Thomas | H05K 9/0069 |
| 2017/0006395 | A1* | 1/2017 | Loo | H04R 1/04 |
| 2017/0201842 | A1* | 7/2017 | Liu | H04R 29/001 |

* cited by examiner

MICROPHONE MUTING DEVICE

CROSS-REFERENCES TO RELATED APPLICATIONS

This application claims priority to U.S. Patent Application Ser. No. 62/459,172 (the "'172 application"), filed Feb. 15, 2017 by Edward J. Kim et al., entitled, "Microphone Muting Device," the disclosure of which is incorporated herein by reference in its entirety for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to methods, systems, and apparatuses for implementing a muting device, and, more particularly, to methods, systems, and apparatuses for muting a microphone of an electronic device.

BACKGROUND

Privacy while using electronic devices is a major concern with modern connectivity to others. Many solutions to help provide protection are employed by users, such as camera blocking mechanisms and software to thwart hackers. One common component that is overlooked is the microphone. Someone may be listening or recording audio from a user's electronic device in an attempt to use the information maliciously.

Hence, there is a need for more robust and scalable solutions for implementing a muting device, and, more particularly, to methods, systems, and apparatuses for muting a microphone of an electronic device.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF CERTAIN EMBODIMENTS

Overview

Figure 1:
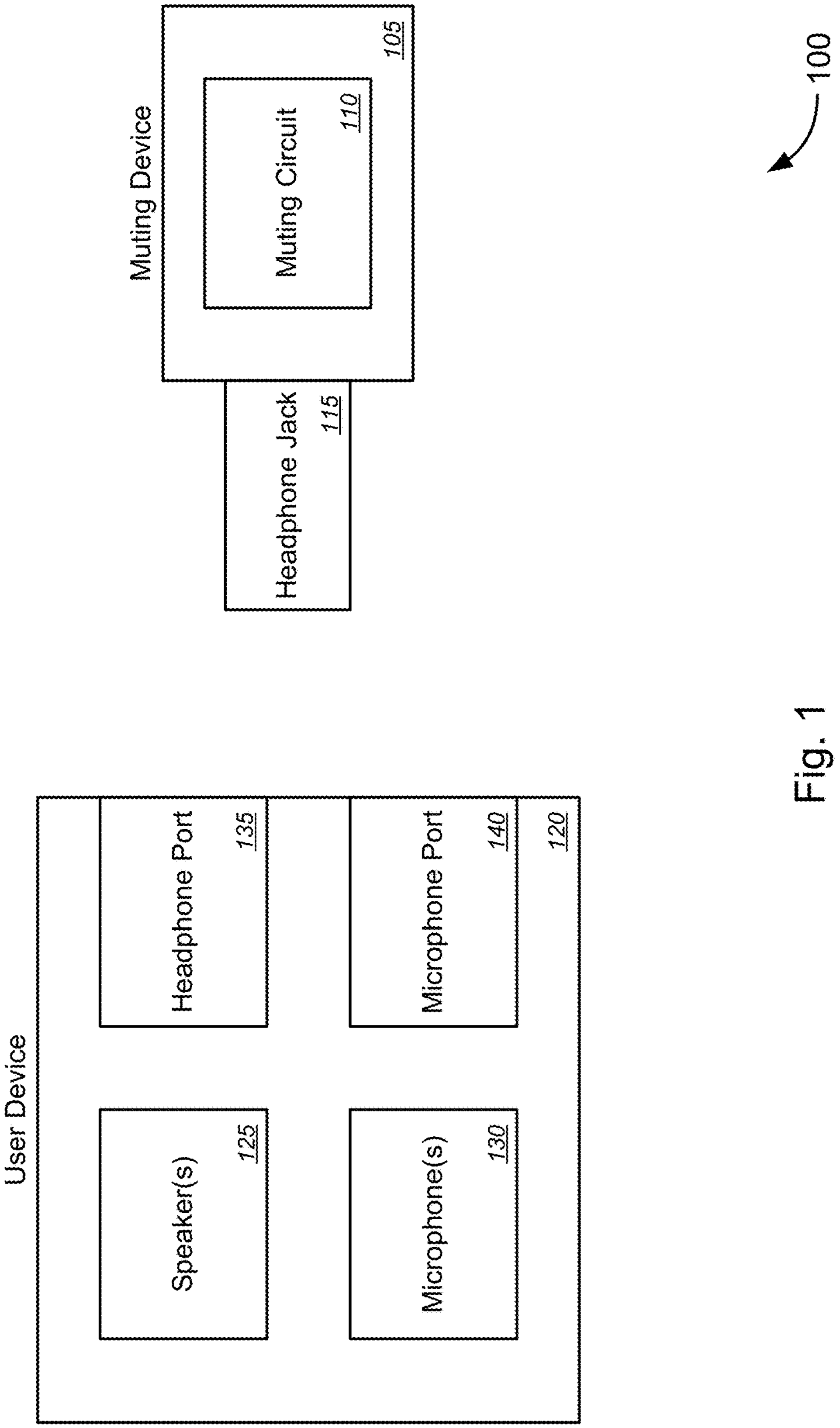
FIG. 1 is a schematic diagram illustrating a system for muting a microphone of an electronic device, in accordance with various embodiments.

Various embodiments provide tools and techniques for implementing a muting device, and, more particularly, to methods, systems, and apparatuses for muting a microphone of an electronic device.

In various embodiments, a muting device might include a headphone jack and a muting circuit. The headphone jack might include a first contact, a second contact, a third contact, and a fourth contact, the first contact including a left line output contact, the second contact including a right line output contact, the third contact including a ground contact, and a fourth contact including a microphone contact. The muting circuit might simulate an external microphone being connected to the headphone jack, without the microphone contact being connected to any microphone. In particular, when the headphone jack of the muting device is connected to the headphone port of a user device, the muting circuit might send a signal to the user device indicating that an external microphone is communicatively coupled to the headphone jack, thereby causing the built-in microphone of the user device to be deactivated.

In other words, the various embodiments provide an approach to combat the unauthorized use of a built-in microphone of an electronic device from (unbeknownst to a nearby user) remotely listening or recording audio from the user's electronic device (whether in an attempt to use the information maliciously or otherwise), by mimicking the use of a headset and physically overriding the microphone signal to the user's electronic device. The various embodiments thus provide a lightweight portable solution to secure an electronic device. The figures show various forms of the embodiments that can be inserted into other electronic hardware. The various embodiments are designed to be detected by an electronic device and to override the microphone input so no sound is detected. Some electronic devices that can be used include, but are not limited to, laptops, desktops, mobile phones, and/or the like. A mechanical switch or electronic requirement may be present in the electronic device in order for the muting circuit to be properly recognized. Other electronic devices may require other means in order for the invention to be recognized by circuit or by other mechanical means. Although the various embodiments are described as being embodied by a headphone jack, other physical forms of the invention may be used without deviating from the scope of the invention. The circuit to mimic a microphone as seen in FIG. 2 is present but doesn't allow sound to be detected. Other hardware may require different circuit configurations in order for the muting invention to mimic microphone properties.

These and other functionalities of the system and device are described in detail below with respect to FIGS. 1-4.

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

In an aspect, a muting device might comprise a headphone jack and a muting circuit. The headphone jack might comprise a first contact, a second contact, a third contact, and a fourth contact, the first contact comprising a left line output contact, the second contact comprising a right line output contact, the third contact comprising a ground contact, and a fourth contact comprising a microphone contact. The muting circuit might simulate an external microphone being connected to the headphone jack, without the microphone contact being connected to any microphone.

In some embodiments, the headphone jack might comprise a headphone jack based on one of CTIA protocol or American headset jack ("AM") protocol, wherein the first contact is the tip contact, the second contact is the ring 1 contact, the third contact is the ring 2 contact, and the fourth contact is the sleeve contact. Alternatively, the headphone jack might comprise a headphone jack based on open mobile terminal platform ("OMTP") protocol, wherein the first contact is the tip contact, the second contact is the ring 1 contact, the fourth contact is the ring 2 contact, and the third contact is the sleeve contact.

According to some embodiments, the muting circuit might comprise a first end and a second end, the first end communicatively coupled with one of the first contact or the second contact, the second end communicatively coupled with the fourth contact. In some cases, the muting circuit simulates the external microphone being connected to the headphone jack, by using a sub-circuit having a predetermined electrical impedance between the first end and the second end.

In another aspect, a system might comprise a user device and a muting device. The user device might comprise a built-in microphone and a headphone port. The muting device might comprise a headphone jack and a muting circuit. The headphone jack might comprise a first contact, a second contact, a third contact, and a fourth contact, the first contact comprising a left line output contact, the second contact comprising a right line output contact, the third contact comprising a ground contact, and a fourth contact comprising a microphone contact. The muting circuit might simulate an external microphone being connected to the headphone jack, without the microphone contact being connected to any microphone. When the headphone jack of the muting device is connected to the headphone port of the user device, the muting circuit sends a signal to the user device indicating that an external microphone is communicatively coupled to the headphone jack, wherein the signal causes the microphone of the user device to be deactivated, wherein the microphone contact of the muting device is not connected to any microphone.

In some embodiments, the headphone jack might comprise a headphone jack based on one of CTIA protocol or American headset jack ("AM") protocol, wherein the first contact is the tip contact, the second contact is the ring 1 contact, the third contact is the ring 2 contact, and the fourth contact is the sleeve contact. Alternatively, the headphone jack might comprise a headphone jack based on open mobile terminal platform ("OMTP") protocol, wherein the first contact is the tip contact, the second contact is the ring 1 contact, the fourth contact is the ring 2 contact, and the third contact is the sleeve contact.

According to some embodiments, the muting circuit might comprise a first end and a second end, the first end communicatively coupled with one of the first contact or the second contact, the second end communicatively coupled with the fourth contact. In some cases, the muting circuit simulates the external microphone being connected to the headphone jack, by using a sub-circuit having a predetermined electrical impedance between the first end and the second end.

Merely by way of example, in some cases, the user device might comprise one of a smart phone, a mobile phone, a music playback device, a laptop device, a desktop device, a television, a monitor, a tabletop telephone, or a wall-mounted telephone, and/or the like.

In yet another aspect, a method might comprise, in response to inserting a headphone jack of a muting device into a headphone port of a user device, sending, with a muting circuit of the muting device, a signal to the user device indicating that an external microphone is communicatively coupled to the headphone jack, wherein the signal causes the microphone of the user device to be deactivated, wherein the microphone contact of the muting device is not connected to any microphone.

Various modifications and additions can be made to the embodiments discussed without departing from the scope of the invention. For example, while the embodiments described above refer to particular features, the scope of this invention also includes embodiments having different combination of features and embodiments that do not include all of the above described features.

Specific Exemplary Embodiments

We now turn to the embodiments as illustrated by the drawings. FIGS. 1-4 illustrate some of the features of the method, system, and apparatus for implementing a muting device, and, more particularly, to methods, systems, and apparatuses for muting a microphone of an electronic device, as referred to above. The methods, systems, and apparatuses illustrated by FIGS. 1-4 refer to examples of different embodiments that include various components and steps, which can be considered alternatives or which can be used in conjunction with one another in the various embodiments. The description of the illustrated methods, systems, and apparatuses shown in FIGS. 1-4 is provided for purposes of illustration and should not be considered to limit the scope of the different embodiments.

With reference to the figures, FIG. 1 is a schematic diagram illustrating a system 100 for muting a microphone of an electronic device, in accordance with various embodiments.

In the non-limiting embodiment of FIG. 1, system 100 might comprise a muting device 105, which might comprise a muting circuit 110 and a headphone jack 115. The headphone jack 115 might include, without limitation, a first contact, a second contact, a third contact, and a fourth contact. In some embodiments, the first contact might comprise a left line output contact, the second contact might comprise a right line output contact, the third contact might comprise a ground contact, and a fourth contact might comprise a microphone contact. In some cases, the headphone jack might comprise a headphone jack based on one of CTIA protocol or American headset jack ("AM") protocol, where the first contact is the tip contact, the second contact is the ring 1 contact, the third contact is the ring 2 contact, and the fourth contact is the sleeve contact. Alternatively, the headphone jack might comprise a headphone jack based on open mobile terminal platform ("OMTP") protocol, where the first contact is the tip contact, the second contact is the ring 1 contact, the fourth contact is the ring 2 contact, and the third contact is the sleeve contact.

According to some embodiments, the muting circuit 110 might comprise a first end and a second end, the first end might communicatively couple with one of the first contact or the second contact, while the second end might communicatively couple with the fourth contact. In some cases, the muting circuit might simulate an external microphone being connected to the headphone jack, by using a sub-circuit having a predetermined electrical impedance between the first end and the second end. Merely by way of example, in some cases, the predetermined electrical impedance might include, without limitation, resistance values ranging between about 5 kΩ and about 15 kΩ, in some cases, preferably 10 kΩ According to some embodiments, resistance values below 5 kΩ or greater than 15 kΩ may also be used. In some embodiments, the sub-circuit may include a combination of resistors, inductors, and/or conductors to simulate presence of an external microphone.

System 100 might further comprise user device 120, which might include, without limitation, one or more speakers 125, one or more built-in microphones 130, a headphone port 135, and a microphone port 140 (optional). In some cases, the headphone port 135 and the microphone port 140 might be embodied as a combined port. When the headphone jack 115 is inserted into the headphone port 135 (or the combined headphone/microphone port), the sub-circuit having the predetermined electrical impedance simulates an external microphone being connected to the headphone jack, thereby causing the built-in microphone(s) 130 to become deactivated (in lieu of the (simulated) external microphone). Because no microphone is actually electrically coupled to the microphone contact of the muting device 105, there are no active microphone devices or audio sensors to pick-up or otherwise sense any verbal utterings by a nearby user. In this manner, a small form factor, secure and effective muting device can be achieved.

Figure 2A:
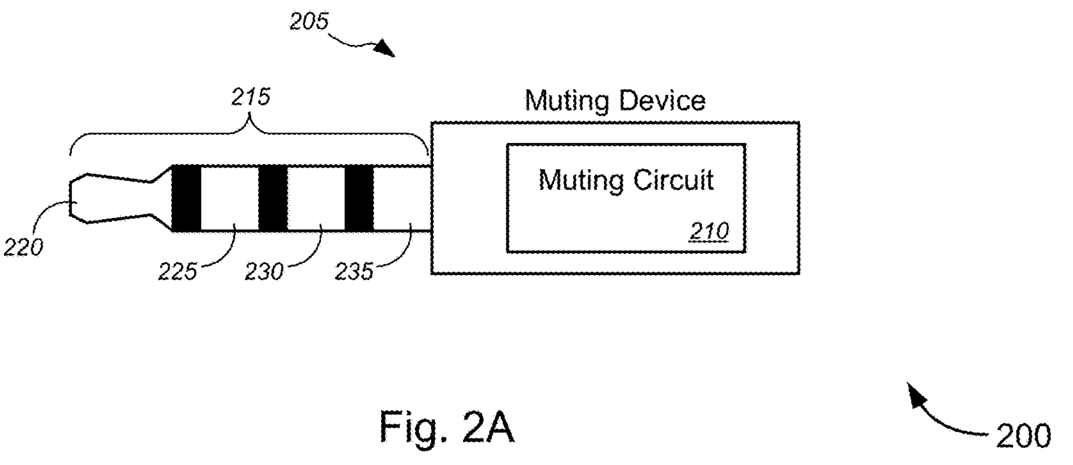
FIGS. 2A-2C are schematic diagrams illustrating various embodiments of a muting device that can be used to mute a microphone of an electronic device.
Figure 2B:
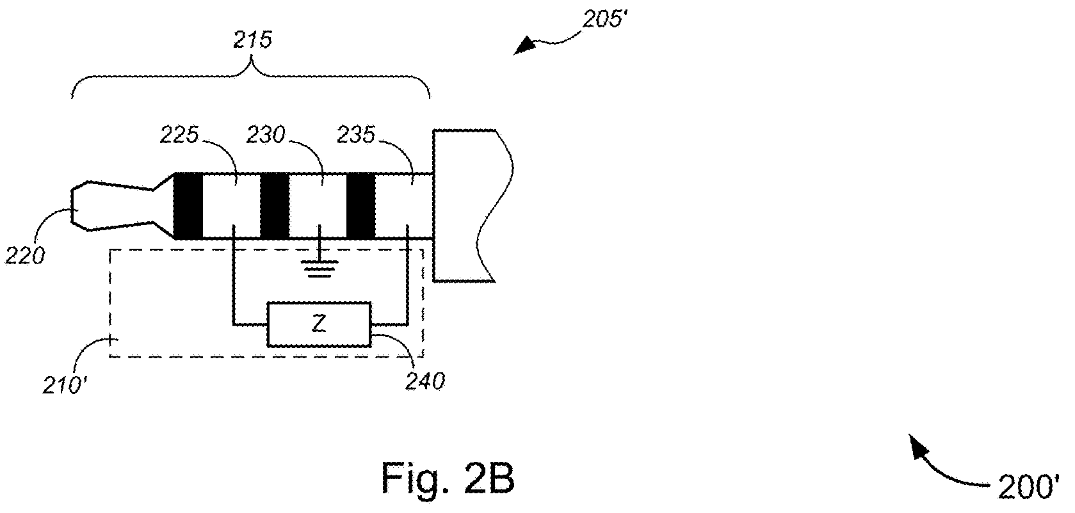
Figure 2C:
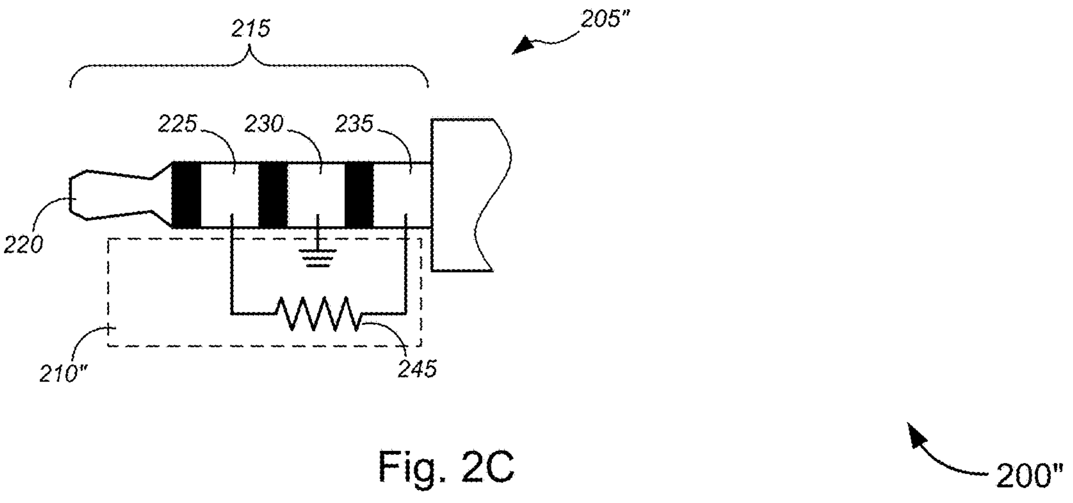

FIGS. 2A-2C (collectively, "FIG. 2") are schematic diagrams illustrating various embodiments 200, 200', and 200" of a muting device that can be used to mute a microphone of an electronic device.

With reference to the non-limiting embodiment 200 of FIG. 2A, muting device 205 might comprise a muting circuit 210 and a headphone jack 215. The muting circuit 210. Headphone jack 215, in some embodiments, might comprise a first contact 220 (also referred to as "a tip contact" or the like), a second contact 225 (also referred to as "a ring 1 contact" or the like), a third contact 230 (also referred to as "a ring 2 contact" or the like), and a fourth contact 235 (also referred to as "a sleeve contact" or the like), with each adjacent contact being separated by electrically insulating material. Under the CTIA protocol or American headset jack ("AHJ") protocol, the tip contact, the ring 1 contact, the ring 2 contact, and the sleeve contact correspond to the right line output contact, the left line output contact, the ground contact, and the microphone contact, respectively. Alternatively, under the open mobile terminal platform ("OMTP") protocol, the tip contact, the ring 1 contact, the ring 2 contact, and the sleeve contact correspond to the right line output contact, the left line output contact, the microphone contact, and the ground contact, respectively. For purposes of illustration, FIG. 2 depicts a headphone jack under the CTIA or AHJ protocol.

Turning to the non-limiting embodiment 200' of FIG. 2B, muting circuit 210' (which may be disposed within the muting device 205' (as shown, e.g., in FIG. 2A with muting circuit 210 being disposed within the body of muting device 205) may include, without limitation, a sub-circuit 240 having a predetermined electrical impedance (with a combination of resistors, capacitors, and/or inductors) to simulate the presence of an external microphone being electrically coupled the microphone contact (i.e., fourth contact 235), when the headphone jack 215 is inserted into the headphone port of the user device (e.g., headphone port 135 of user device 120 of FIG. 1, or the like).

In some embodiments, as shown, e.g., in the non-limiting embodiment 200" of FIG. 2C, for instance, muting circuit 210" (which may be disposed within the muting device 205" (as shown, e.g., in FIG. 2A with muting circuit 210 being disposed within the body of muting device 205) may include, without limitation, a sub-circuit 245 having a predetermined electrical impedance (in this case, one or more resistors) to simulate the presence of an external microphone being electrically coupled the microphone contact (i.e., fourth contact 235), when the headphone jack 215 is inserted into the headphone port of the user device (e.g., headphone port 135 of user device 120 of FIG. 1, or the like). Merely by way of example, in some cases, the predetermined electrical impedance might include, without limitation, resistance values ranging between about 5 kΩ and about 15 kΩ, in some cases, preferably 10 kΩ. According to some embodiments, resistance values below 5 kΩ or greater than 15 kΩ may also be used.

The muting device 205, 205', or 205", the muting circuit 210, 210', or 210", and the headphone jack 215 of FIGS. 2A-2C are otherwise similar, if not identical, to the muting device 105, the muting circuit 110, and the headphone jack 115, respectively, of system 100 of FIG. 1, and the description of the components of system 100 are applicable to the corresponding components of FIGS. 2A-2C.

Figure 3:
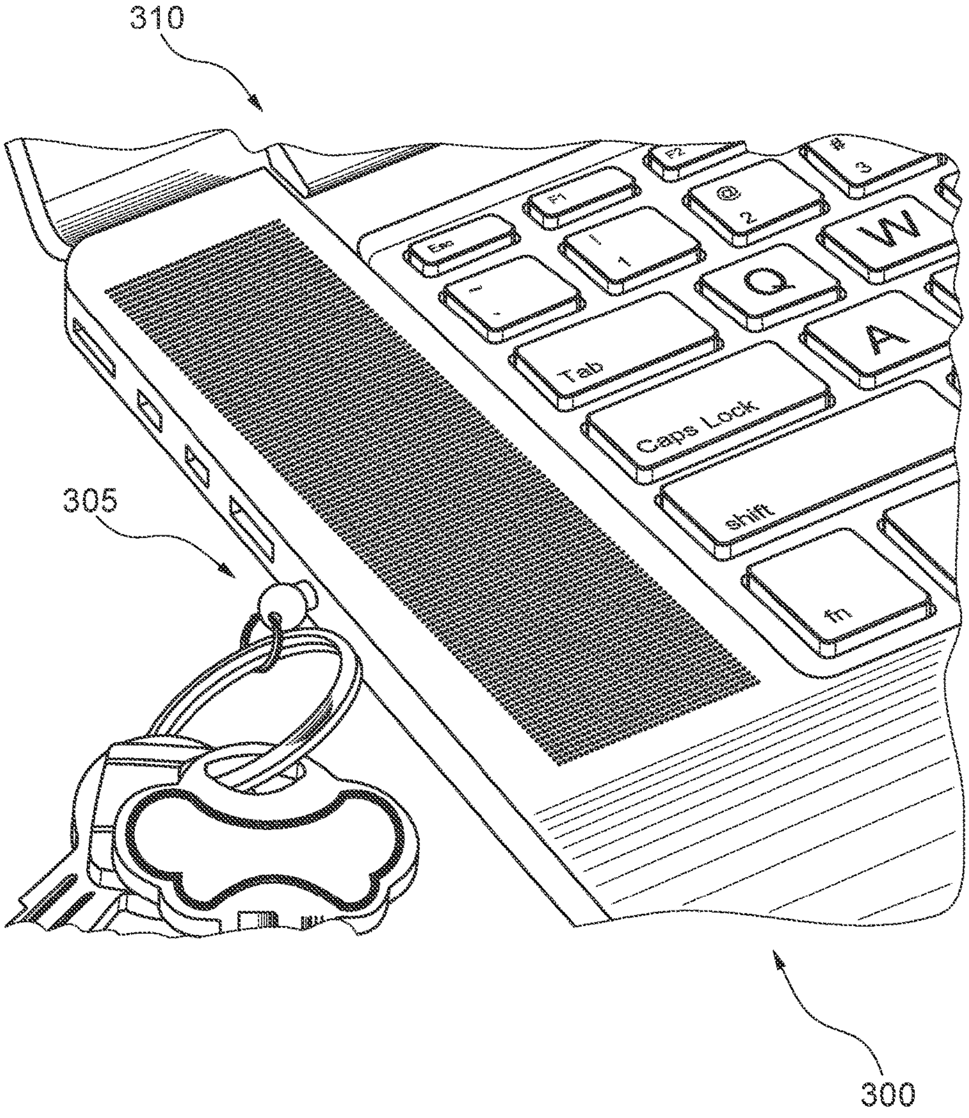
FIG. 3 is a diagram illustrating an embodiment of a muting device being inserted in a headphone port of a user device to prevent a built-in microphone of the user device from being activated.

FIG. 3 is a diagram illustrating an embodiment 300 of a muting device being inserted in a headphone port of a user device to prevent a built-in microphone of the user device from being activated.

FIG. 3 depicts a non-limiting embodiment of a muting device 305 being inserted into a headphone port of a laptop device 310. In this embodiment, the muting device 305 is shown attached to a key chain. Although the user device is shown in FIG. 3 as being embodied by a laptop device, the various embodiments are not so limited, and the user device can be embodied by any suitable user device, including, but not limited to, one of a smart phone, a mobile phone, a music playback device, a laptop device, a desktop device, a television, a monitor, a tabletop telephone, or a wall-mounted telephone, and/or the like. Although the muting device 305 is depicted as being a keychain-attachable device, the various embodiments are not so limited, and the muting device 305 may be attachable to any suitable external body, include, without limitation, a keychain, a key fob, a flash drive (or USB drive), a pin, a bracelet, a ring, a pen cap, a brooch, and/or the like.

Figure 4:
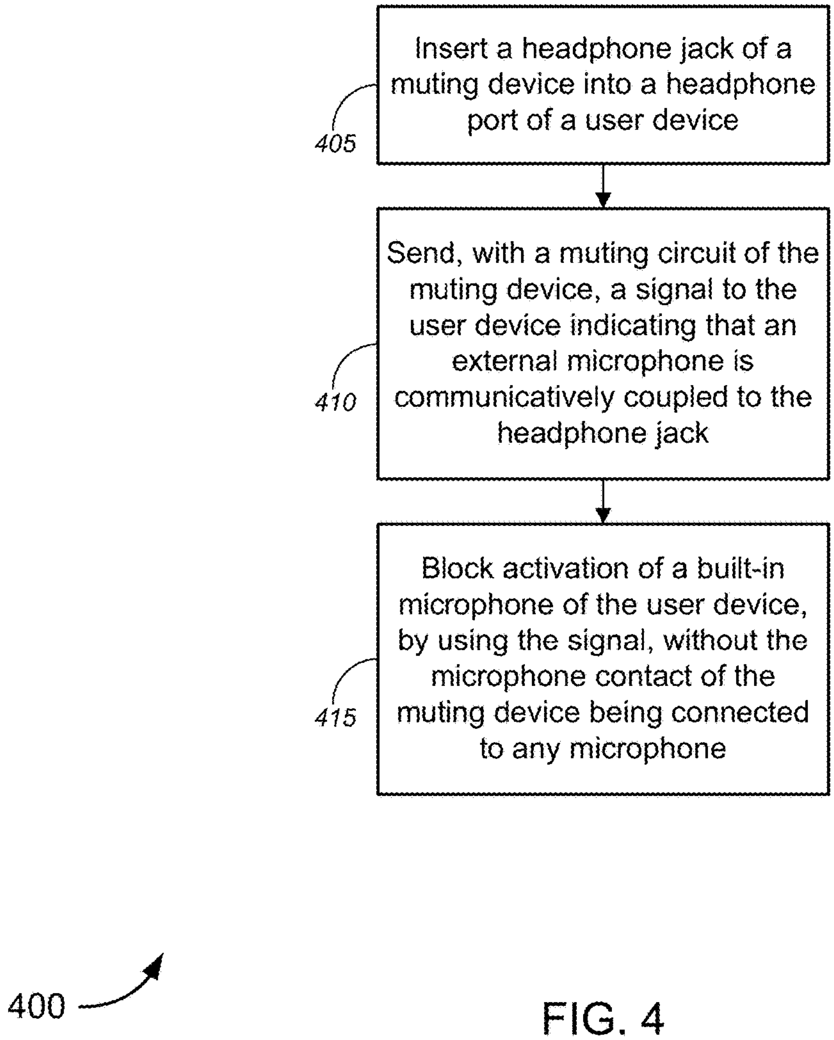
FIG. 4 is a flow diagram illustrating a method for muting a microphone of an electronic device, in accordance with various embodiments.

FIG. 4 is a flow diagram illustrating a method 400 for muting a microphone of an electronic device, in accordance with various embodiments.

While the techniques and procedures are depicted and/or described in a certain order for purposes of illustration, it should be appreciated that certain procedures may be reordered and/or omitted within the scope of various embodiments. Moreover, while the method 400 illustrated by FIG. 4 can be implemented by or with (and, in some cases, are described below with respect to) the systems or embodiments 100, 200, 200', 200'', and 300 of FIGS. 1-3 (or components thereof), such methods may also be implemented using any suitable hardware (or software) implementation. Similarly, while each of the systems or embodiments 100, 200, 200', 200'', and 300 of FIGS. 1-3 (or components thereof), can operate according to the method 400 illustrated by FIG. 4 (e.g., by executing instructions embodied on a computer readable medium), the systems or embodiments 100, 200, 200', 200'', and 300 of FIGS. 1-3 can each also operate according to other modes of operation and/or perform other suitable procedures.

In the non-limiting embodiment of FIG. 4, method 400, at block 405, might comprise inserting a headphone jack of a muting device into a headphone port of a user device. At block 410, method 400 might comprise sending, with a muting circuit of the muting device, a signal to the user device indicating that an external microphone is communicatively coupled to the headphone jack. Method 400 might further comprise blocking activation of a built-in microphone of the user device, by using the signal, without the microphone contact of the muting device being connected to any microphone.

In some embodiments, sending the signal to the user device might comprise using a sub-circuit having a predetermined electrical impedance between the microphone contact of the headphone jack of the muting device and one of the left line output contact or the right line output contact of the headphone jack. When the headphone jack is inserted into the headphone port, the muting circuit electrically connects with the circuit of the user device coupled to the headphone port. Electrical current running through the muting circuit from the circuit of the user device, particularly when running through the sub-circuit having the predetermined electrical impedance simulates the presence of an external microphone, which causes any built-in microphone of the user device to become deactivated (in lieu of the external microphone). Because no microphone is actually electrically coupled to the microphone contact of the muting device, there are no active microphone devices or audio sensors to pick-up or otherwise sense any verbal utterings by a nearby user. In this manner, a small form factor, secure and effective muting device can be achieved.

Merely by way of example, in some cases, the predetermined electrical impedance might include, without limitation, resistance values ranging between about 5 kΩ and about 15 kΩ, in some cases, preferably 10 kΩ. According to some embodiments, resistance values below 5 kΩ or greater than 15 kΩ may also be used. In some embodiments, the sub-circuit may include a combination of resistors, inductors, and/or conductors to simulate presence of an external microphone.

While certain features and aspects have been described with respect to exemplary embodiments, one skilled in the art will recognize that numerous modifications are possible. For example, the methods and processes described herein may be implemented using hardware components. Further, while various methods and processes described herein may be described with respect to particular structural and/or functional components for ease of description, methods provided by various embodiments are not limited to any particular structural and/or functional architecture but instead can be implemented on any suitable hardware and/or configuration of hardware. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A muting device, comprising:

a headphone jack, comprising a first contact, a second contact, a third contact, and a fourth contact, the first contact comprising a left line output contact, the second contact comprising a right line output contact, the third contact comprising a ground contact, and a fourth contact comprising a microphone contact;

a muting circuit that simulates an external microphone being connected to the headphone jack, without the microphone contact being connected to any microphone.

2. The muting device of claim 1, wherein the headphone jack comprises a headphone jack based on one of CTIA protocol or American headset jack ("AM") protocol, wherein the first contact is the tip contact, the second contact is the ring 1 contact, the third contact is the ring 2 contact, and the fourth contact is the sleeve contact.

3. The muting device of claim 1, wherein the headphone jack comprises a headphone jack based on open mobile terminal platform ("OMTP") protocol, wherein the first contact is the tip contact, the second contact is the ring 1 contact, the fourth contact is the ring 2 contact, and the third contact is the sleeve contact.

4. The muting device of claim 1, wherein the muting circuit comprises a first end and a second end, the first end communicatively coupled with one of the first contact or the second contact, the second end communicatively coupled with the fourth contact.

5. The muting device of claim 4, wherein the muting circuit simulates the external microphone being connected to the headphone jack, by using a sub-circuit having a predetermined electrical impedance between the first end and the second end.

6. A system, comprising:
- a user device, comprising:
  - a built-in microphone; and
  - a headphone port;
- a muting device, comprising:
  - a headphone jack, comprising a first contact, a second contact, a third contact, and a fourth contact, the first contact comprising a left line output contact, the second contact comprising a right line output contact, the third contact comprising a ground contact, and a fourth contact comprising a microphone contact;
  - a muting circuit that simulates an external microphone being connected to the headphone jack;
- wherein when the headphone jack of the muting device is connected to the headphone port of the user device, the muting circuit sends a signal to the user device indicating that an external microphone is communicatively coupled to the headphone jack, wherein the signal causes the microphone of the user device to be deactivated, wherein the microphone contact of the muting device is not connected to any microphone.

7. The system of claim 6, wherein the headphone jack comprises a headphone jack based on one of CTIA protocol or American headset jack ("AM") protocol, wherein the first contact is the tip contact, the second contact is the ring 1 contact, the third contact is the ring 2 contact, and the fourth contact is the sleeve contact.

8. The system of claim 6, wherein the headphone jack comprises a headphone jack based on open mobile terminal platform ("OMTP") protocol, wherein the first contact is the tip contact, the second contact is the ring 1 contact, the fourth contact is the ring 2 contact, and the third contact is the sleeve contact.

9. The system of claim 6, wherein the muting circuit comprises a first end and a second end, the first end communicatively coupled with one of the first contact or the second contact, the second end communicatively coupled with the fourth contact.

10. The system of claim 9, wherein the muting circuit simulates the external microphone being connected to the headphone jack, by using a sub-circuit having a predetermined electrical impedance between the first end and the second end.

11. The system of claim 6, wherein the user device comprises one of a smart phone, a mobile phone, a music playback device, a laptop device, a desktop device, a television, a monitor, a tabletop telephone, or a wall-mounted telephone.

12. A method, comprising:
- in response to inserting a headphone jack of a muting device into a headphone port of a user device, sending, with a muting circuit of the muting device, a signal to the user device indicating that an external microphone is communicatively coupled to the headphone jack, wherein the signal causes the microphone of the user device to be deactivated, wherein the microphone contact of the muting device is not connected to any microphone.

* * * * *